United States Patent [19]
Butsuen et al.

[11] Patent Number: 5,332,057
[45] Date of Patent: Jul. 26, 1994

[54] CONTACT PREVENTIVE APPARATUS FOR VEHICLES

[75] Inventors: Tetsuro Butsuen; Toshihiro Hara; Kazuki Fujise; Takeshi Takagi; Satoshi Morioka; Satoru Matsuoka; Naoyuki Hikida; Ayumu Doi, all of Hiroshima, Japan

[73] Assignee: Mazda Motor Corporation, Hiroshima, Japan

[21] Appl. No.: 120,223

[22] Filed: Sep. 14, 1993

Related U.S. Application Data

[63] Continuation of Ser. No. 934,324, Aug. 25, 1992, abandoned.

[30] Foreign Application Priority Data

Aug. 27, 1991 [JP] Japan .................. 3-215539

[51] Int. Cl.$^5$ .............................. B60T 7/12
[52] U.S. Cl. ........................ 180/169; 303/95; 364/426.01; 364/461
[58] Field of Search ............ 180/169, 168, 167; 303/95, 97, 100, 109, 20; 364/426.01, 426.04, 461, 424

[56] References Cited

U.S. PATENT DOCUMENTS

| | | | |
|---|---|---|---|
| 4,073,359 | 2/1978 | Fujiki | 180/169 |
| 4,361,202 | 11/1982 | Minovitch | 180/168 |
| 4,809,178 | 2/1989 | Ninomiya | 364/461 |
| 4,926,171 | 5/1990 | Kelly | 364/461 |
| 5,166,881 | 11/1992 | Akasu | 180/169 |

FOREIGN PATENT DOCUMENTS

| | | |
|---|---|---|
| 39-5668 | 4/1964 | Japan . |
| 2231609 | 9/1990 | Japan . |

*Primary Examiner*—David M. Mitchell
*Attorney, Agent, or Firm*—Sixbey, Friedman, Leedom & Ferguson

[57] ABSTRACT

A contact preventive system for vehicles using an automatic braking device and an automatic steering device together. Contact forecasting mechanism forecasts the contact of a vehicle with an obstacle. When the contact of the obstacle is forecasted, automatic braking control mechanism operates the automatic braking device. Environment detecting mechanism detects the change of environment such as a friction coefficient of a road. Automatic steering control mechanism operates the automatic steering device to alter the advance direction of the vehicle when a possibility of contact is caused by the change of environment during automatic braking. Thus, contact can be avoided.

11 Claims, 15 Drawing Sheets

CONTACT PREVENTIVE APPARATUS FOR VEHICLES

This application is a continuation of Ser. No. 07/934,324, filed Aug. 25, 1992, now abandoned.

BACKGROUND OF THE INVENTION

The present invention relates to a contact preventive apparatus for vehicles, having an automatic steering device for performing steering to prevent a vehicle from coming in contact with an obstacle and an automatic braking device for automatically braking wheels when forecasting contact depending on a distance between the vehicle and the obstacle and a relative speed.

Japanese Patent Publication No. 5668/1964 has disclosed an automatic braking device for vehicles in which a distance between a vehicle and a forward obstacle and a relative speed are continuously detected by an optical method, ultrasonic waves or the like, it is decided whether contact may occur depending on the distance and relative speed thus detected, and an actuator is operated to automatically brake wheels so that contact can be prevented when it is decided that there is a possibility of contact.

However, in a changing environment such as if a friction coefficient of a road changes during automatic braking so that conditions vary, the automatic braking device described above cannot correspond to variation in condition.

Japanese Unexamined Patent Publication No. 231609/1990 has disclosed an automatic steering device. Similarly, in a changing environment such as if a friction coefficient of a road changes during automatic steering so that conditions vary, the automatic steering device cannot correspond to variation in condition.

SUMMARY OF THE INVENTION

It is an object of the present invention to provide a contact preventive apparatus for vehicles in which an automatic braking device and an automatic steering device are efficiently operated together so as to avoid contact.

The present invention provides a contact preventive apparatus for vehicles having an automatic steering device for performing steering to prevent a vehicle from coming in contact with an obstacle, and an automatic braking device for automatically braking wheels when forecasting contact depending on a distance between the vehicle and the obstacle and a relative speed.

The contact preventive apparatus for vehicles according to the present invention comprises contact forecasting means for forecasting the contact of the vehicle with the obstacle, automatic braking control means for receiving the output of the contact forecasting means and operating the automatic braking device when forecasting the contact of the obstacle, environment detecting means for detecting a change in the environment such as a friction coefficient of a road, and automatic steering control means for receiving the output of the environment detecting means and for operating the automatic steering device to alter the advance direction of the vehicle when a possibility of contact is caused by the change of environment during automatic braking. Consequently, when the possibility of contact is caused by the change of environment during automatic braking, the automatic steering device is operated to alter the advance direction of the vehicle. Thus, contact can be avoided.

The contact forecasting means forecasts that the vehicle may come in contact with the obstacle when the relative speed of the vehicle to the obstacle is smaller than 0 and the distance between the vehicle and the obstacle is not greater than a predetermined distance.

The automatic steering control means continues automatic steering until a time for passing the obstacle elapses, and performs corrective steering in which the advance direction after ending automatic steering is caused to correspond to that when starting steering after the passing time elapses.

The automatic braking control means continues automatic braking if the distance between the vehicle and the obstacle is greater than a predetermined distance necessary for automatic steering performed so as to avoid contact.

The environment detecting means recognizes other nearby vehicles, and the automatic braking control means receives the output of the environment detecting means and prohibits the control of the automatic steering device performed by the automatic steering control means to operate only the automatic braking device when other nearby vehicles are recognized. Consequently, when other vehicles are recognized, the control of the automatic steering device performed by the automatic steering control means is prohibited so that only the automatic braking device is operated. Accordingly, it is possible to surely prevent the vehicle from coming in contact with other vehicles which run therearound.

The environment detecting means detects the presence of a turn signal and that of a friction coefficient of a road on which a vehicle runs.

The contact preventive apparatus for vehicles according to the present invention further comprises speed detecting means for detecting the speed of a vehicle, wherein the automatic braking control means receives the output of the speed detecting means and prohibits the control of the automatic steering device performed by the automatic steering control means to operate only the automatic braking device when the speed of the vehicle is equal to or greater than a predetermined speed. Consequently, when the speed of the vehicle is equal to or greater than the predetermined speed, the control of the automatic steering device performed by the automatic steering control means is prohibited so that only the automatic braking device is operated. Accordingly, when the speed of the vehicle is reduced, automatic steering is performed. Thus, it is possible to reliably perform automatic steering.

The automatic braking control means performs automatic braking if the distance between the vehicle and the obstacle is smaller than the sum of a distance necessary to reduce the speed of the vehicle to a predetermined speed and a distance at which the contact of the vehicle with the obstacle can be avoided by automatic steering when the speed of the vehicle is a predetermined speed.

This and other objects, features and advantages of the present invention will become more apparent upon a reading of the following detailed description and drawings.

BRIEF DESCRIPTION OF THE DRAWINGS

A preferred embodiment of the present invention is illustrated in the drawings, in which.

DETAILED DESCRIPTION OF THE PREFERRED EMBODIMENT

A preferred embodiment of the present invention will be described in detail with reference to the drawings.

Figure 1:
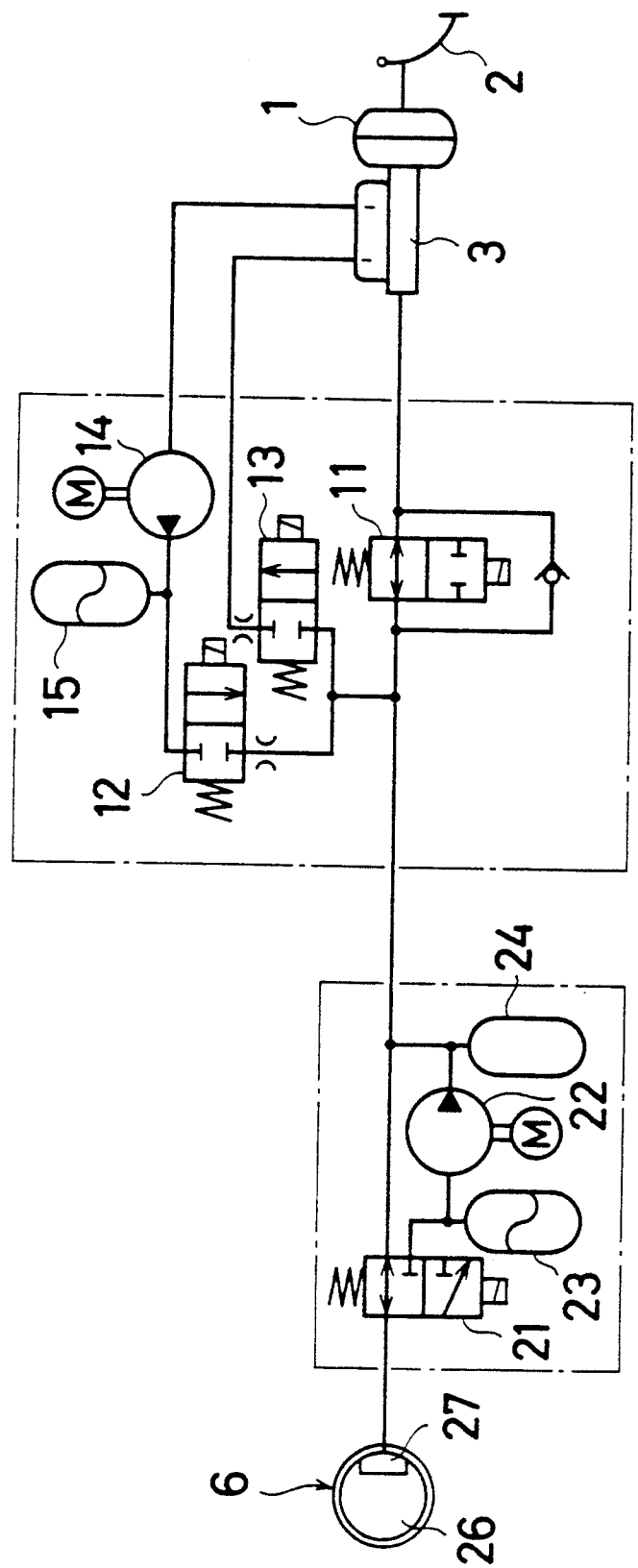
FIG. 1 is a hydraulic circuit diagram of an automatic braking device.
Figure 2:
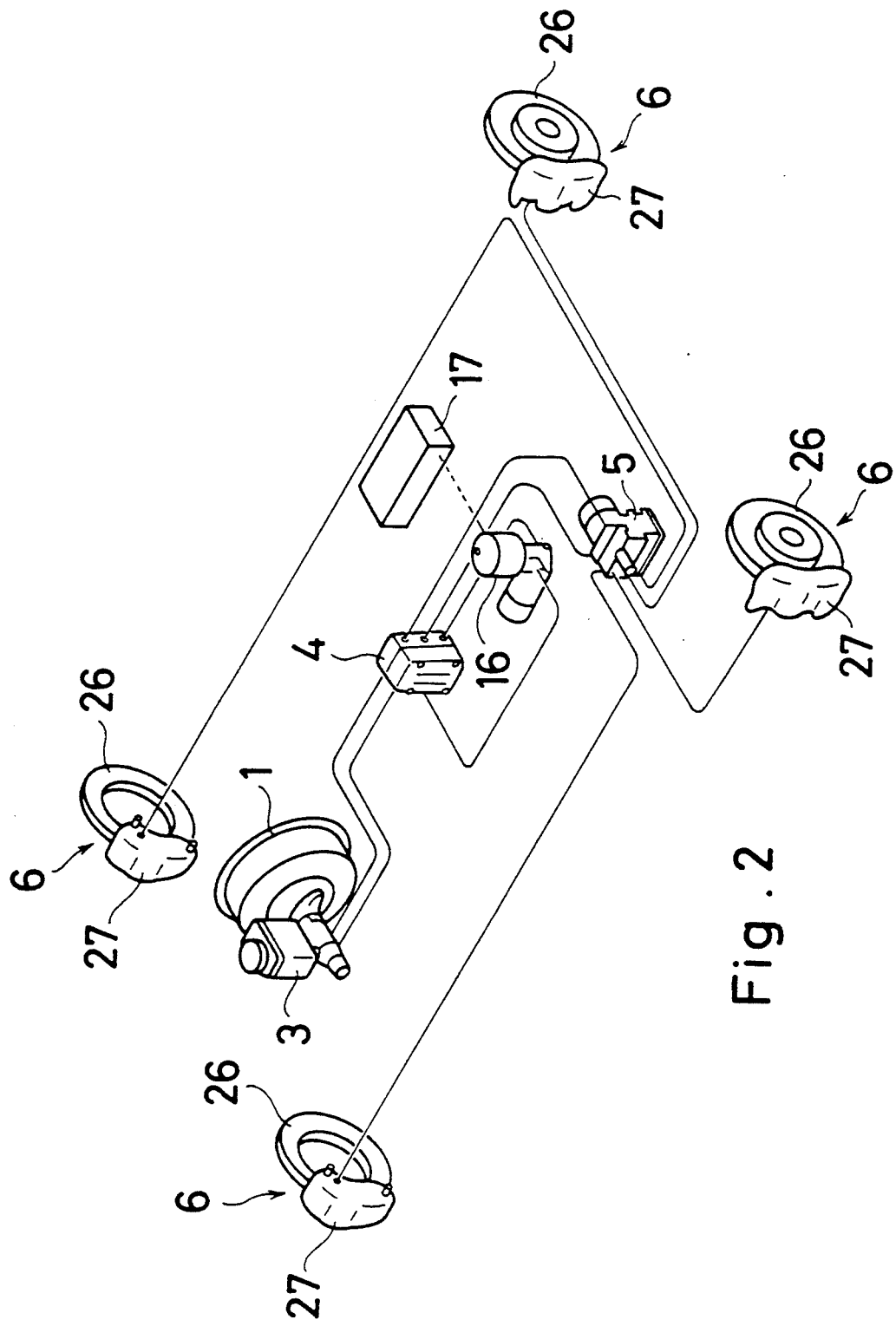
FIG. 2 is a view showing the arrangement of components of a hydraulic circuit of the automatic braking device.
Figure 3:
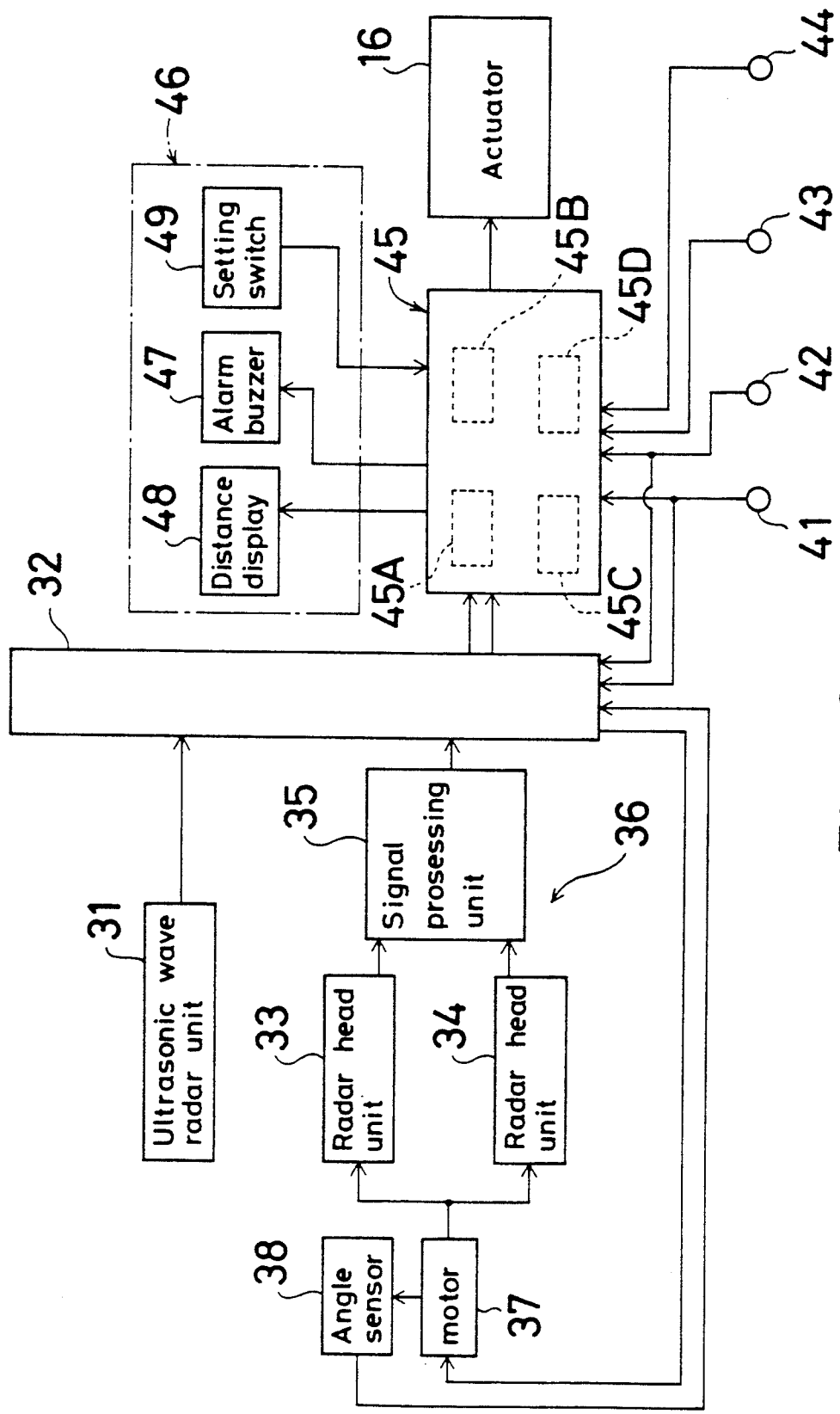
FIG. 3 is a block diagram showing the automatic braking device.

FIGS. 1 to 3 show an automatic braking device for vehicles according to the present invention. FIGS. 1 and 2 show the structure of a hydraulic circuit of the automatic braking device. FIG. 3 shows the block structure of the automatic braking device.

In FIGS. 1 and 2, the reference numeral 1 denotes a master vac for increasing the operating force of a brake pedal 2 generated by a driver, and the reference numeral 3 denotes a master cylinder for generating a braking pressure corresponding to the operating force increased by the master vac 1. The braking pressure generated by the master cylinder 3 is first supplied to an automatic braking valve unit 4 and then to a braking device 6 for each wheel through an ABS (antiskid braking device) valve unit 5.

The automatic braking valve unit 4 includes a shutter valve 11, an intensifying valve 12 and a reducing valve 13. The shutter valve 11 blocks communication between the master cylinder 3 and the braking device 6 side. The valves 11 to 13 are electromagnetic 2-port 2-position switching valves. A motor driving oil pump 14 and an accumulator 15 are provided between the intensifying valve 12 and the master cylinder 3. The accumulator 15 serves to store pressure oil discharged from the oil pump 14 therein and hold the same at a constant pressure. When the shutter valve 11 is opened, braking is performed according to the operating force of the brake pedal 2 by means of the braking device 6 for each wheel. When the shutter valve 11 is closed, the intensifying valve 12 is opened and the reducing valve 13 is closed, the pressure oil discharged from the accumulator 15 is supplied to the braking device 6 so as to perform braking. When the intensifying valve 12 is closed and the reducing valve 13 is opened, the pressure oil is returned from the braking device 6 so that braking is reduced.

The valves 11 to 13 are switched by an actuator 16 which includes a voltage supply for applying a voltage to the valves 11 to 13, and the like. The actuator 16 is controlled on receipt of a signal from a control box 17.

The ABS valve unit 5 includes a 3-port 2-position switching valve 21 which is provided for each wheel. When performing braking, the valve 21 is switched to control a braking pressure applied to the braking device 6 so that the wheel is unlocked. The structure of the ABS valve unit 5 will not be described in detail. The ABS valve unit 5 also includes a motor driving oil pump 22, accumulators 23 and 24, and the like. The braking device 6 includes a disk 26 and a caliper 27. The disk 26 rotates integrally with the wheel. The caliper 27 holds the disk 26 on receipt of a braking pressure from the master cylinder 3 side.

In FIG. 3, the reference numeral 31 denotes a ultrasonic radar unit provided on the front of a vehicle body. As is generally known, the ultrasonic radar unit 31 has a structure in which a transmitting portion transmits ultrasonic waves to an obstacle such as a forward vehicle, and a receiving portion receives waves reflected by the forward obstacle, which is not shown in detail. An arithmetic unit 32 receives a signal from the radar unit 31 and calculates a distance between a vehicle and a forward obstacle and a relative speed based on a lag time (Doppler shift) of radar receive waves behind a transmitting time. The reference numerals 33 and 34 denote a pair of radar head units provided on both sides of the front portion of the body. Each of the radar head units 33 and 34 has a structure in which a transmitting portion transmits pulse laser beams to a forward obstacle and a receiving portion receives light reflected by the forward obstacle. The arithmetic unit 32 receives a signal from the radar head units 33 and 34 through a signal processing unit 35, and calculates a distance between the vehicle and the forward obstacle and a relative speed based on a lag time of laser received behind a transmitting time. The arithmetic unit 32 gives priority to the arithmetic results of the distance and relative speed obtained by a system which employs the radar head units 33 and 34, and additionally uses the arithmetic results of the distance and relative speed obtained by a system which employs the ultrasonic radar unit 31. The ultrasonic radar unit 31, arithmetic unit 32, radar head units 33 and 34, and signal processing unit 35 form distance and relative speed detecting means 36 for detecting a distance between a vehicle and a forward obstacle, and a relative speed.

Directions in which pulse laser beams are transmitted from and received by the radar head units 33 and 34 can horizontally be changed by a motor 37. The actuation of the motor 37 is controlled by the arithmetic unit 32. The reference numeral 38 denotes an angle sensor for detecting the transmitting and receiving directions of the pulse laser beams based on the rotary angle of the motor 37. A detection signal generated by the angle sensor 38 is inputted to the arithmetic unit 32. The transmitting and receiving directions of the pulse laser beams are added to the calculation on the distance and relative speed performed by a system employing the radar head units 33 and 34 which is provided in the arithmetic unit 32.

The reference numeral 41 denotes a steering angle sensor for detecting a steering angle. The reference numeral 42 denotes a speed sensor for detecting a speed. The reference numeral 43 denotes a longitudinal G sensor for detecting a longitudinal acceleration (longitudinal G) of a vehicle. The reference numeral 44 denotes road friction coefficient detecting means for detecting a friction coefficient ($\mu$) of a road. Detection signals generated by the sensors 41 to 44 are inputted to a control unit 45. The control unit 45 serves to control the actuator 16. The control unit 45 also receives signals of the distance between a vehicle and a forward obstacle and of the relative speed which are obtained by the arithmetic unit 32. The control unit 45 and arithmetic unit 32 are housed in the control box 17 (see FIG. 2). The reference numeral 46 denotes an alarm display unit which is provided on an interior instrument panel. The alarm display unit 46 includes an alarm buzzer 47 and a distance display portion 48 which receive signals from the control unit 45 respectively, and a setting switch 49 for selectively regulating automatic braking by a driver. A signal generated by the setting switch 49 is outputted to the control unit 45.

Figure 4:
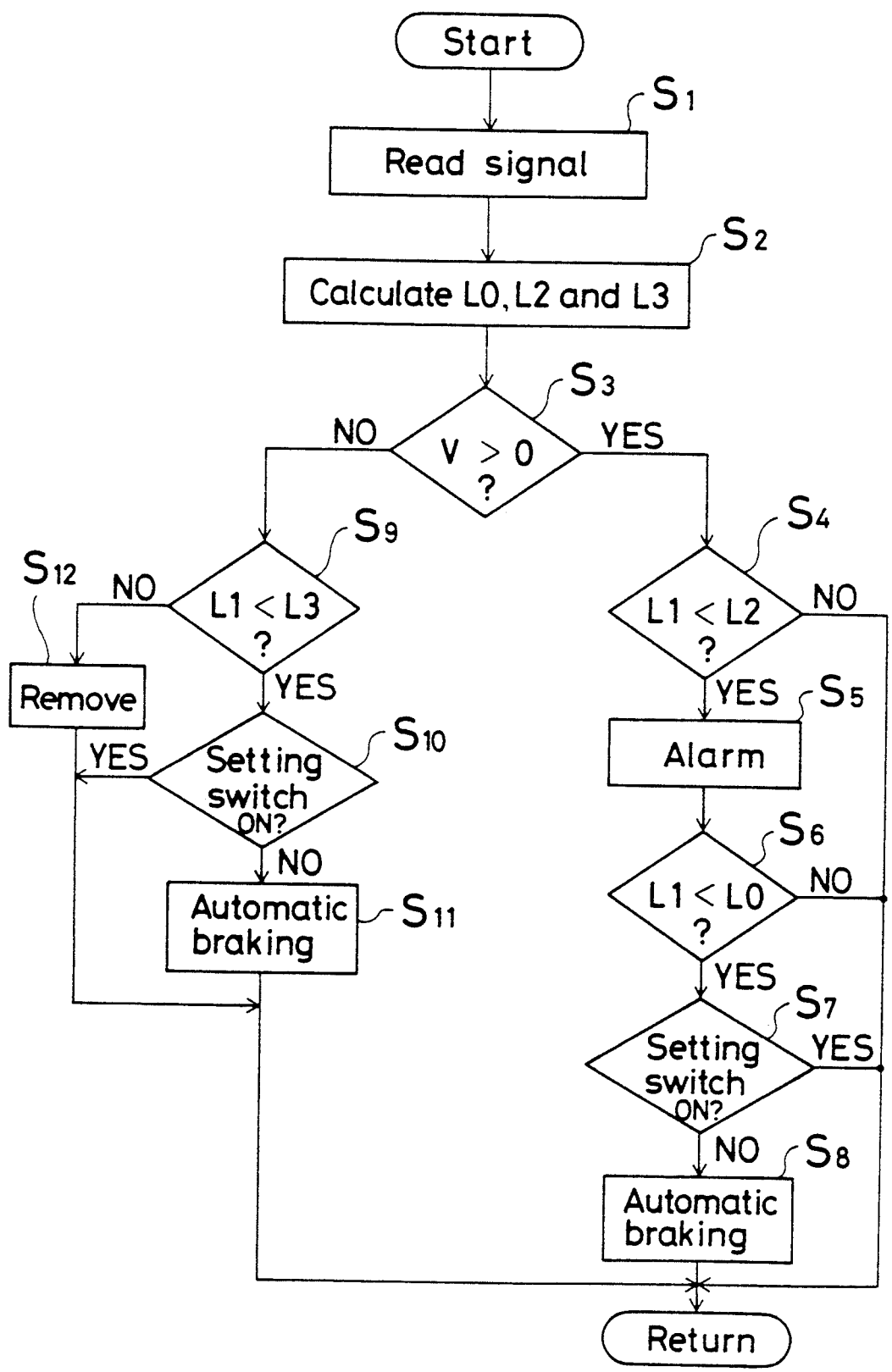
FIG. 4 is a flow chart showing the control flow of automatic braking for contact prevention performed by a control unit.

FIG. 4 shows the control flow of automatic braking for contact prevention performed by the control unit 45. In the control flow, various signals are first read at Step S1, and thresholds L0, L2 and L3 are calculated at Step S2. The threshold L0 is a minimum distance between vehicles at which the vehicle may come in contact with the forward obstacle and automatic braking is started to prevent contact. The threshold L0 of a possibility of contact (or of automatic braking start) is calculated according to a subroutine shown in FIG. 5. A calculation method will be described below. The threshold L2 is a distance between the vehicle and the forward obstacle (alarm distance) at which an alarm is raised prior to automatic braking start, and is set greater than the threshold L0 by a predetermined amount. The threshold L3 is a distance between the vehicle and the forward obstacle at which the possibility of contact is eliminated after automatic braking start so that automatic braking is removed, and is set greater than the threshold L0 by a predetermined amount.

After the thresholds L0, L2 and L3 are calculated, it is decided whether a relative speed V of the vehicle to the forward obstacle is greater than 0, that is, they are approaching each other at Step S3. If decision is YES, it is decided whether a distance L1 between the vehicle and the forward obstacle (hereinafter referred to as a distance between vehicles) is smaller than the threshold L2 at Step S4. If decision is YES, the alarm buzzer 47 is sounded at Step S5. At Step S6, it is decided whether the distance L1 is smaller than the threshold L0. If decision is YES, it is ascertained that the setting switch 49 is not turned ON at Step S7. At Step S8, the actuator 16 is operated to perform automatic full-braking. Then, this routine returns. If decision is NO in Step S4 or S6, this routine immediately returns.

If decision is NO in Step S3, that is, the vehicle and the forward obstacle (forward vehicle) are getting away from each other, it is decided whether the distance L1 is smaller than the threshold L3 at Step S9. If decision is YES, it is ascertained that the setting switch 49 is not turned ON at Step S10. At Step S11, this routine returns while automatic braking is performed. If decision is NO in Step S9, automatic braking is removed at Step S12 and this routine then returns.

Contact possibility deciding means has a structure in which it is decided whether the vehicle may come in contact with the forward obstacle depending on the distance between vehicles and the relative speed, and the operation of the actuator 16 is controlled to perform automatic braking if decision is YES according to the control flow.

There will be described a threshold map shown in FIG. 6. Subsequently, there will be described a method for calculating the threshold L0 according to a subroutine shown in FIG. 5. The threshold map is prestored in a storage portion of the control unit 45 so as to calculate the threshold L0. In the threshold map, a threshold line A represents a distance between vehicles necessary to prevent the vehicle from coming in contact with the forward vehicle when it comes in contact with the forward obstacle and stops. In similar to the case where the forward obstacle is a stopping object (that is, a relative speed V is equal to a speed v0 of a vehicle), the distance between vehicles has a value of $v0^2/2\ \mu g$ irrespective of the relative speed V when the forward obstacle is a moving object. A threshold line B represents a distance between vehicles (a numerical formula of $V \cdot (2v0-V)/2\ \mu g$) necessary to prevent the vehicle from coming in contact with the forward vehicle when the forward vehicle performs full-braking. A threshold line C represents a distance between vehicles necessary to prevent the vehicle from coming in contact with the forward vehicle when the forward vehicle performs gentle braking at a deceleration of $\mu/2$ g. A threshold line D represents a distance between vehicles (a numerical formula of $V \cdot^2/2\ \mu g$) necessary to prevent the vehicle from coming in contact with the forward vehicle when the forward vehicle has a constant speed.

A threshold line E represents a distance between vehicles at which the vehicle cannot be prevented from coming in contact with the forward vehicle by performing automatic braking but impact force can be reduced at the time of contact. When the threshold line is on an axis of abscissa (that is, the threshold L0 is always zero), it is supposed that automatic braking is canceled.

Figure 5:
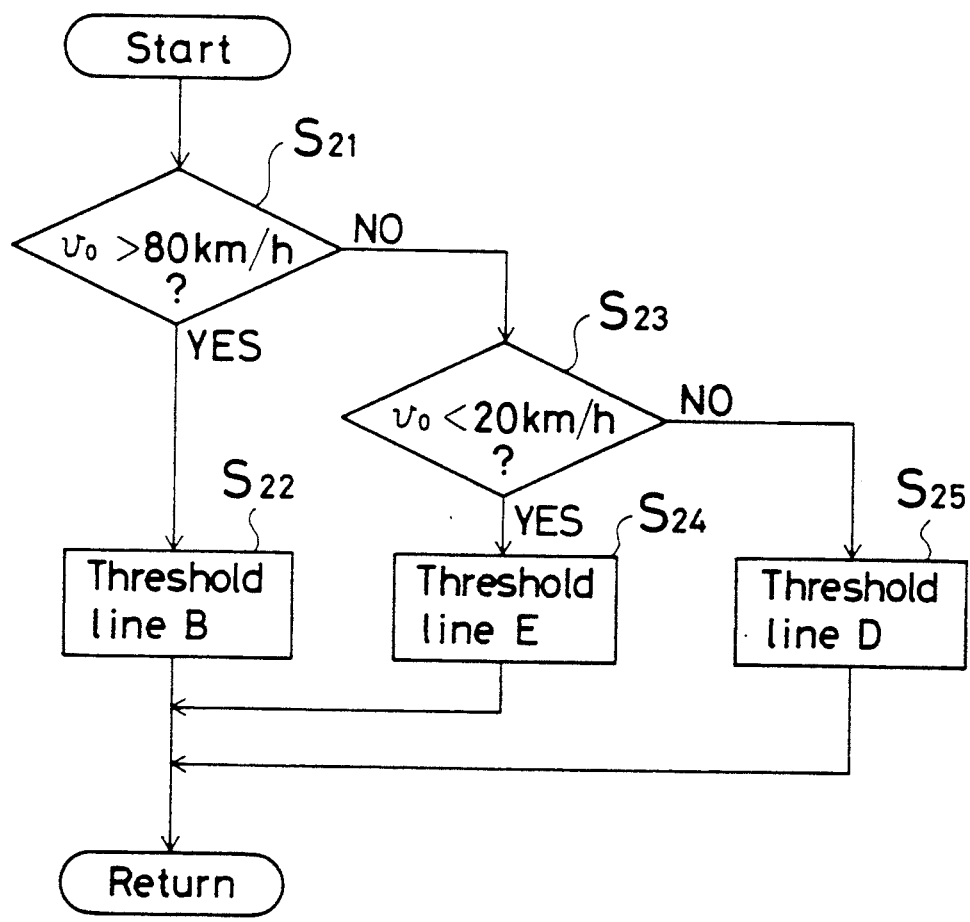
FIG. 5 is a flow chart showing a subroutine for calculating the threshold of a possibility of contact.
Figure 6:
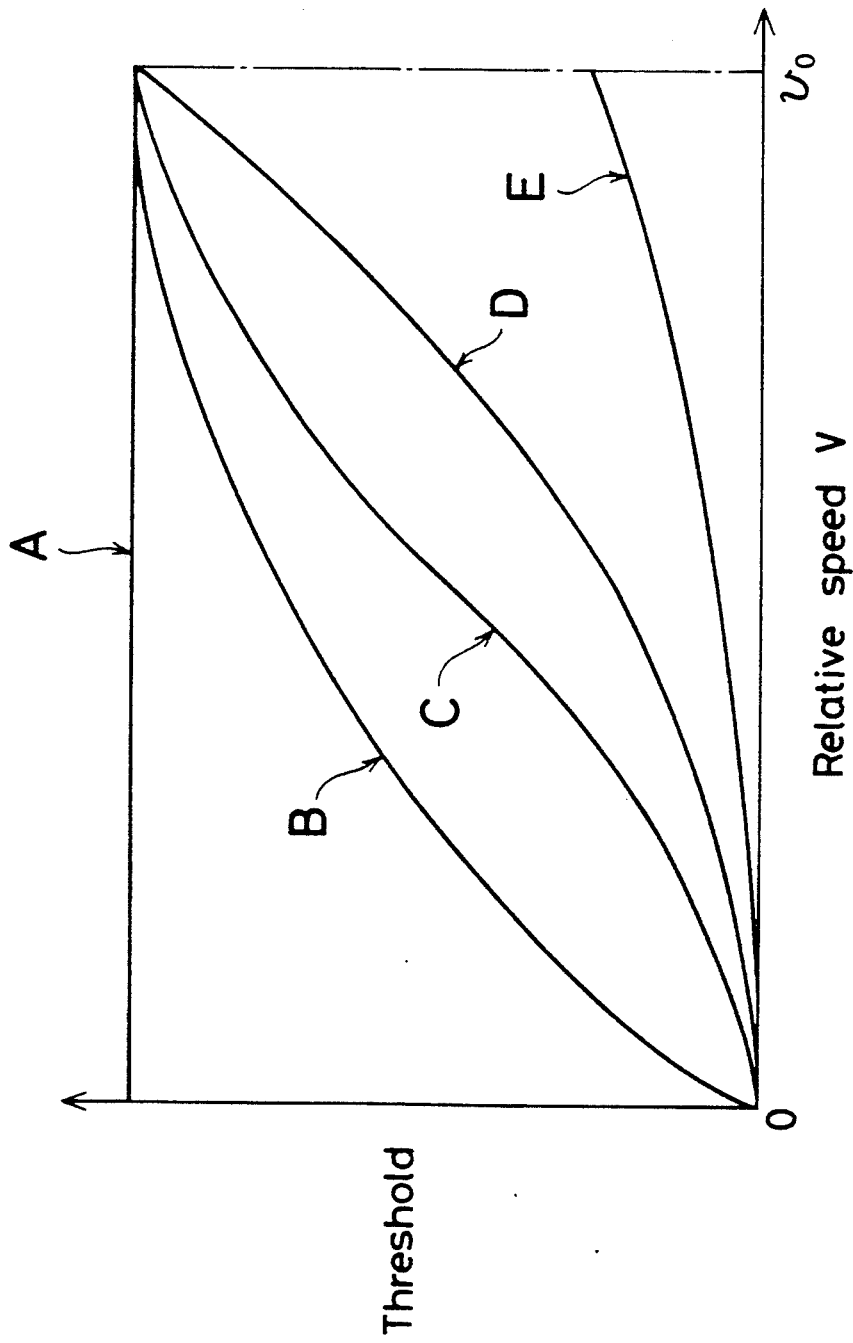
FIG. 6 is a map for calculating the threshold.

In the subroutine shown in FIG. 5, it is decided whether a speed v0 of a vehicle is equal to or greater than 80 km/h at Step S21. If decision is YES, the threshold line B is selected at Step S22. Based on the threshold line B, there is calculated the threshold L0 corresponding to a relative speed at the present time. If decision is NO in Step S21, it is decided whether the speed v0 is smaller than 20 km/h at Step S23. If decision is YES, the threshold line E is selected at Step S24. Based on the threshold line E, there is calculated the threshold L0 corresponding to a relative speed at the present time. If decision is NO in Step S23 (that is, the speed v0 is intermediate), the threshold line D is selected at Step S25. Based on the threshold line D, there is calculated the threshold L0 corresponding to a relative speed at the present time. According to the above-mentioned flow, when the speed is greater, the threshold L0 is increased. More specifically, when the speed is great, there is selected the threshold line B in which contact can be prevented even if the forward vehicle performs full-braking. Based on the threshold line B, there is calculated the threshold L0 corresponding to a relative speed at the present time. Consequently, it is possible to surely prevent contact when the speed is great. If the speed is intermediate, the threshold line D is selected. Consequently, contact can be prevented when the forward vehicle has a constant speed. If the vehicle has a low speed at which impact is small at the time of contact, the threshold line E is selected. Consequently, a distance between the vehicle and the forward vehicle can be reduced so that it is possible for other vehicles to squeeze in.

There will be described an automatic steering device.

Figure 7:
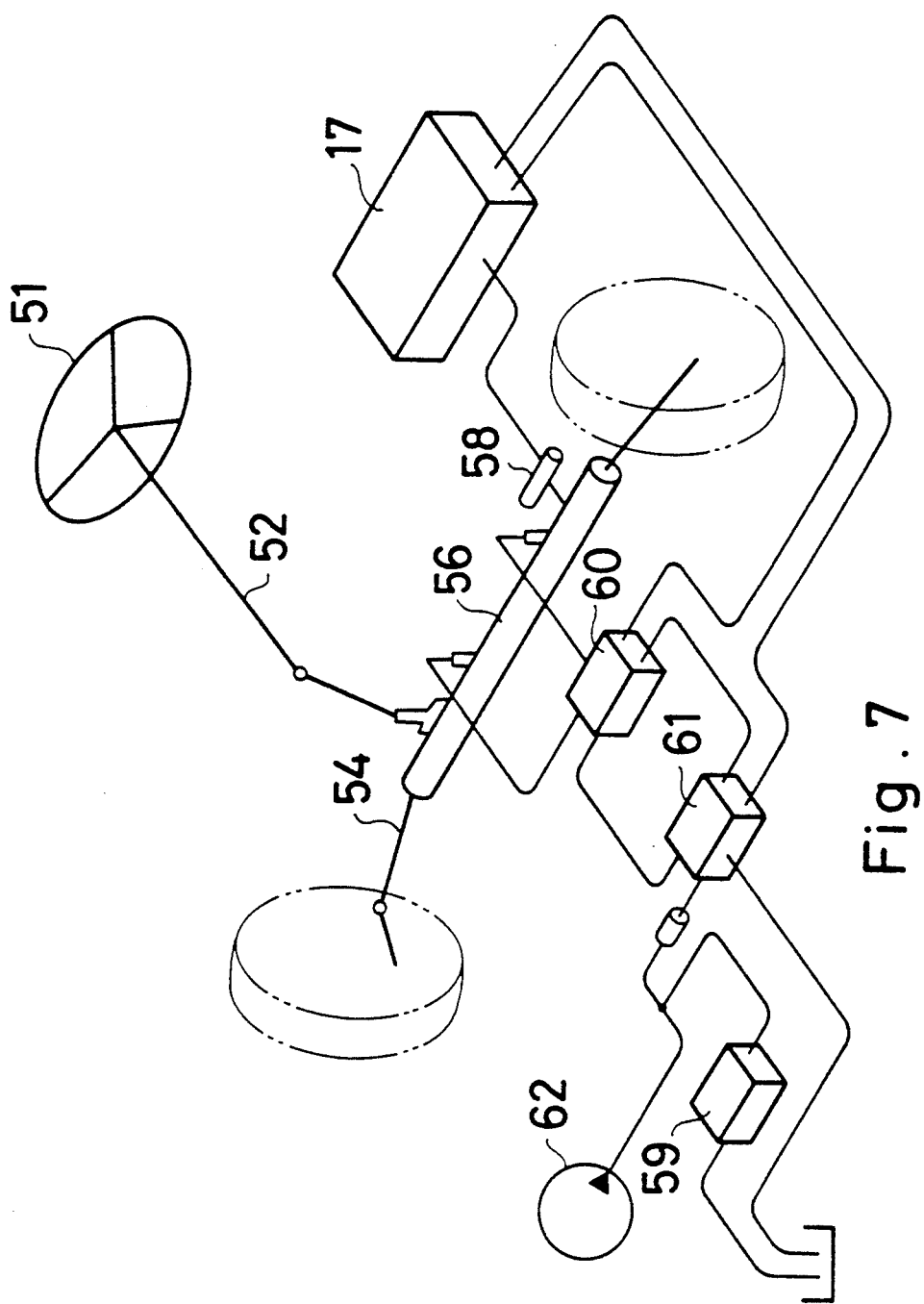
FIG. 7 is a schematic perspective view showing the structure of an automatic steering device for vehicles.

FIG. 7 shows the schematic structure of the automatic steering device. In FIG. 7, the reference numeral 51 denotes a steering wheel. A pinion (not shown) at the lower end of a steering shaft 52 is engaged with a rack portion (not shown) of an axle 54 so that steering can be performed. There is provided an automatic steering cylinder 56 for the axle 54 so that automatic steering can be performed. The control unit 45 controls a relief valve 59, a switching valve 60 and an automatic steering valve 61 on receipt of the output of a position sensor 58 for detecting the position of the axle 54, and supplies pressure oil from an oil pump 62 to the automatic steering cylinder 56. Consequently, automatic steering can be performed by feedback control.

In consideration of a friction coefficient of a road and the motion characteristics of vehicles depending on running conditions for vehicles (a distance between vehicles, a distance between a forward vehicle and a guide rail, and the like), there is set a steering pattern for avoiding contact so that automatic steering is performed if necessary. After automatic steering is completed, there is performed corrective steering for compensating for motion having errors which is caused by the deviation of actual vehicle characteristics from vehicle characteristics used for setting the steering pattern. Consequently, the vehicle is stabilized.

There will be described the control of automatic steering performed by the control unit 45 so as to prevent the vehicle from coming in contact with the forward vehicle.

Figure 8:
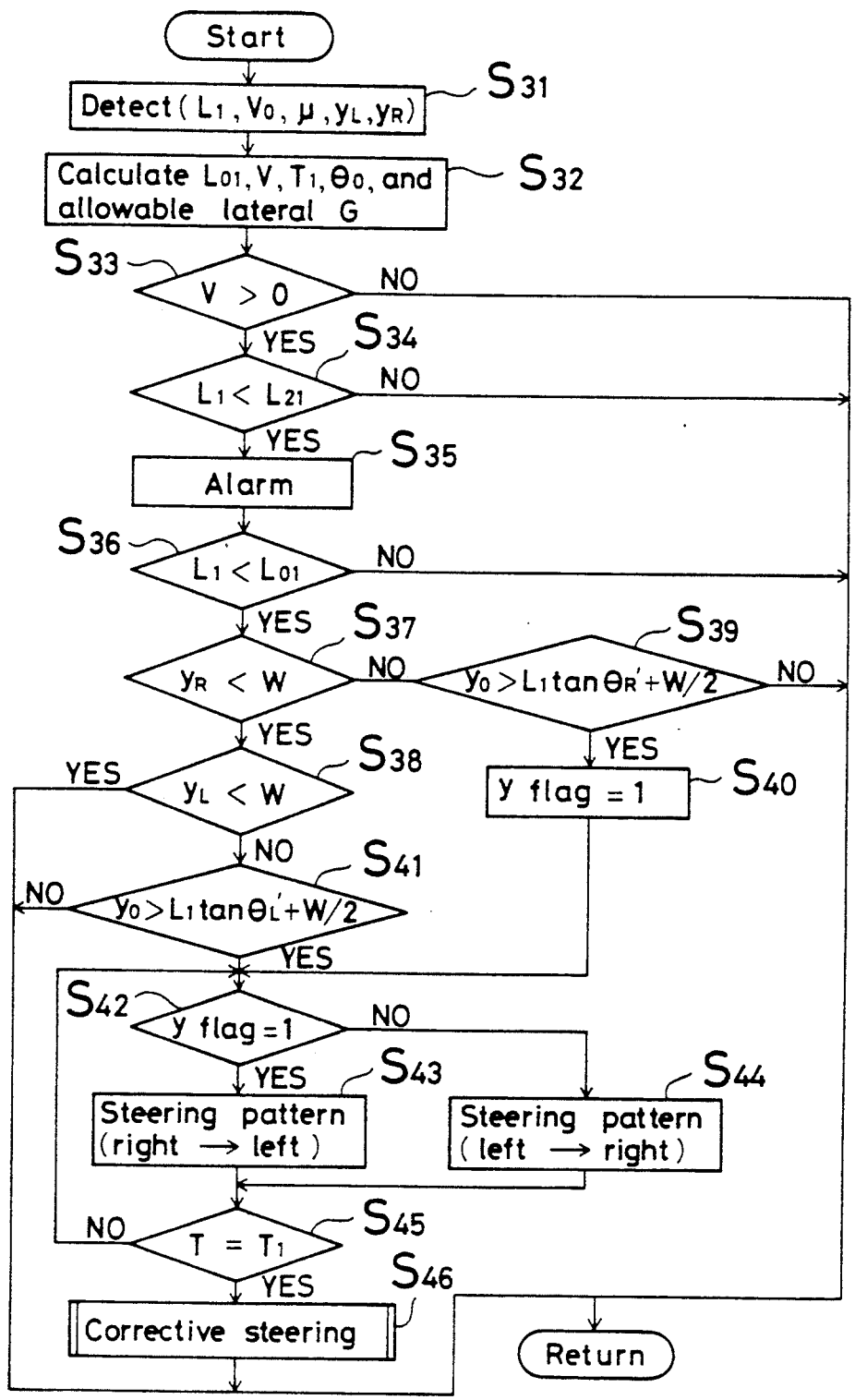
FIG. 8 is a flow chart showing the control for avoiding a forward obstacle.
Figure 9:
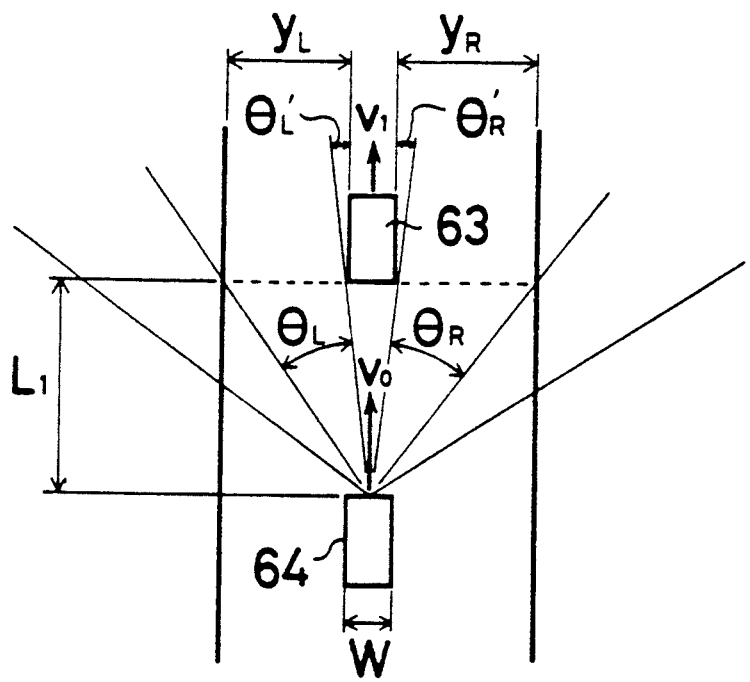
FIG. 9 is a diagram showing the relationship between a vehicle and a forward vehicle.

In FIG. 8, there are first detected a distance L1 between a vehicle and a forward vehicle, a speed v0 of the vehicle, a speed v1 of the forward vehicle, a friction coefficient $\mu$ of a road, a left allowance yL and a right allowance yR (Step S31). By external environment recognition systems such as the radar head units 33 and 34 are detected a distance L1 between a forward vehicle 63 and a vehicle 64, and angles $\theta$ R and $\theta$ L of the forward vehicle with boundary lines of street such as guide rails or white lines on both sides (see FIG. 9). For example, the right and left allowances yR and yL are found by the following formulas.

$yR = L1 \cdot \tan \theta R$ $yL = L1 \cdot \tan \theta L$

The white line can be detected by virtue of reflection by a cat's eye provided thereon or the like and the application of an image processing technique using a video camera or the like.

Based on detected values, there are calculated a minimum distance L01 between vehicles, a relative speed V ($=v0-v1$) of a vehicle to a forward vehicle, a passing time T1, a steering angle $\theta$ H and an allowable lateral G (Step S32).

The minimum distance L01 between vehicles is calculated by the following formula.

$L01 = (v0 - v1) \cdot T1.$

The time T1 necessary for steering is determined by the following formula according to a lateral moving distance y0 and an allowable maximum lateral G. The allowable maximum lateral G is determined by the friction coefficient of a road.

$$T_1 = \sqrt{2\pi \cdot \frac{y_0}{\ddot{y}_0}}$$

In consideration of a model of a vehicle, the steering angle $\theta$ H is determined by the following formula.

$$\frac{\ddot{y}_0}{\theta_H} = \frac{1}{1 + Av_0^2} \cdot \frac{v_0^2}{l} \cdot \frac{\omega_n^2}{N} \cdot \frac{\sqrt{\left(1 - \frac{I\omega^2}{2lKr}\right)^2 + \left(\frac{lr}{v_0}\omega\right)^2}}{\sqrt{(\omega_n^2 - \omega^2)^2 + 4\zeta^2\omega_n^2\omega^2}}$$

where A is a stability factor, V0 is a speed of a vehicle, l is a wheel base, N is a steering gear ratio, $\omega n$ is a natural frequency, I is yaw moment of inertia, Kr is rear cornering power, $\xi$ is a damping ratio, $\omega$ is an input frequency ($=2\pi/T1$), and lr is a longitudinal distance between a center of gravity of a vehicle and a rear axle.

Figure 10:
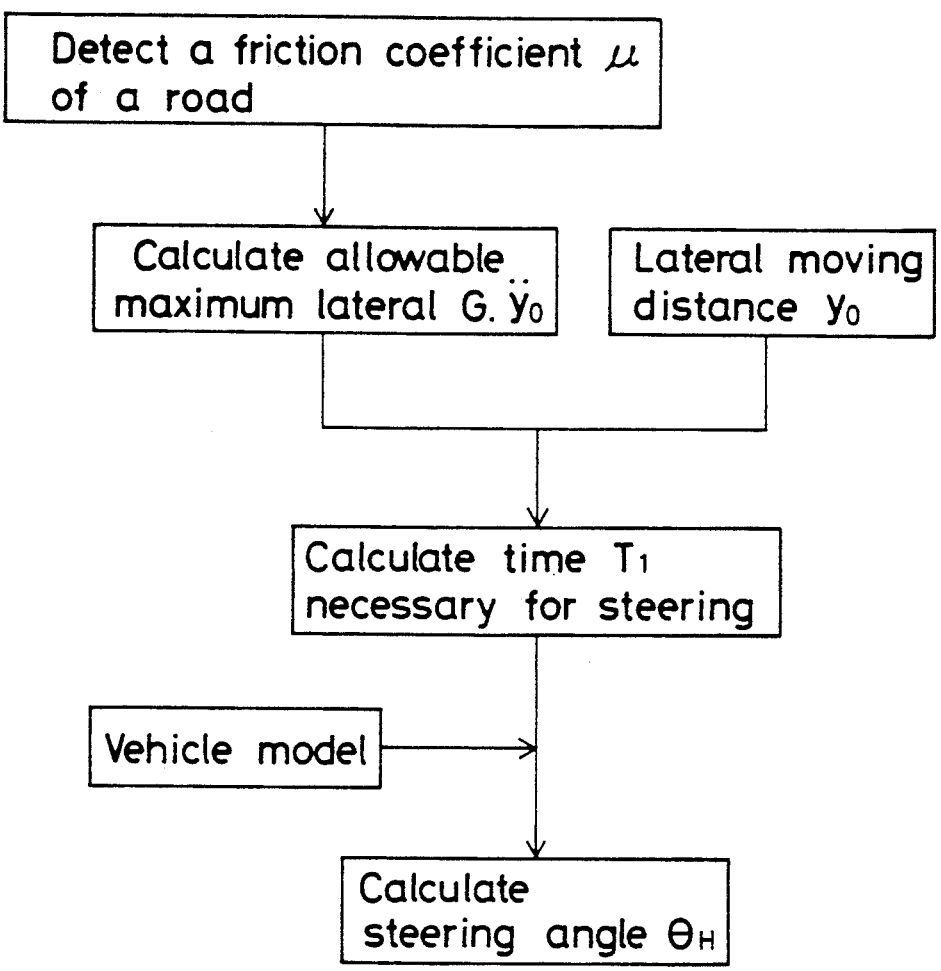
FIG. 10 is a block diagram showing the calculation of a steering angle.

Also in consideration of the friction coefficient detected by a known method, the steering angle is determined (see FIG. 10). More specifically, when the friction coefficient $\mu$ is smaller, the allowable lateral G is decreased.

Figure 11:
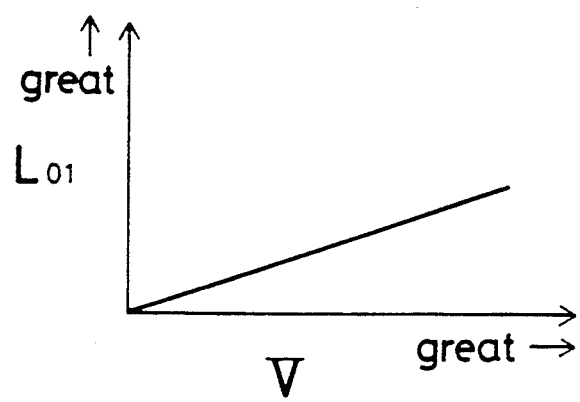
FIG. 11 is a diagram showing the relationship among the steering angle, a lateral moving distance and a passing time.

The necessary lateral moving distance is almost constant. Consequently, when the allowable lateral G is decreased, the time necessary for steering is reduced. Consequently, the steering angle is made smaller. As shown in FIG. 11, when the relative speed V is increased, the minimum distance L01 ($=V \cdot T1$) necessary for automatic steering is made greater.

Figures 12A, 12B:
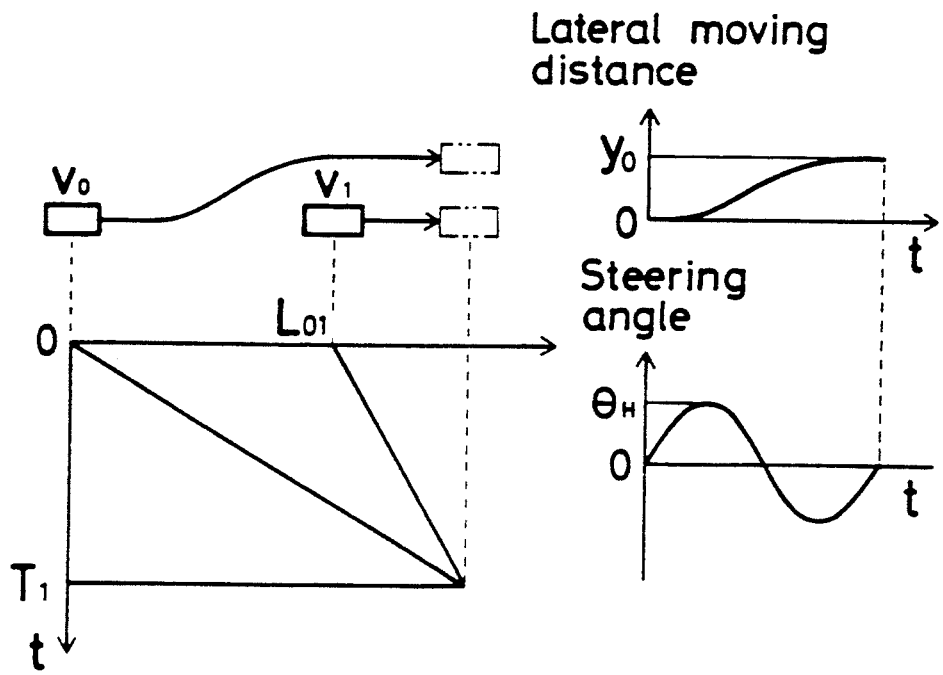
FIGS. 12(a) and 12(b) are diagrams showing the relationship between a relative speed and a minimum distance between vehicles.

Based on the foregoing, an automatic steering pattern is determined as shown in FIGS. 12(a) and 12(b). More specifically, automatic steering is performed with a sine single wave-shaped pattern so that the vehicle can laterally move by a predetermined amount y0 until it catches up with the forward vehicle.

It is decided whether the relative speed V is greater than 0 in order to check whether there is a possibility of contact (Step S33).

If the relative speed V is greater than 0, there is a possibility of contact. Consequently, it is decided whether the distance L1 between vehicles is smaller than an alarm distance L21 (Step S34). If the distance L1 is smaller than the alarm distance L21, an alarm (for example, an alarm lamp or alarm buzzer) is raised (Step S35). If the distance L1 is not smaller than the alarm distance L21, this routine returns.

After the alarm is raised, it is decided whether the distance L1 is smaller than the minimum distance L01 (Step S36). If the distance L1 is smaller than the minimum distance L01, it is necessary to avoid contact. Consequently, it is decided whether the right allowance yR is equal to or smaller than a width W of the vehicle 64 (Step S37) in order to decide whether the vehicle 64 can afford to enter the right space of the forward vehicle 63 (see FIG. 9). If the right allowance yR is equal to or smaller than the width W of the vehicle 64, the vehicle 64 cannot move right. Consequently, it is decided whether the left allowance yL is equal to or smaller than the width W of the vehicle 64 (Step S38). If the left allowance yL is equal to or smaller than the width W of the vehicle 64, the vehicle 64 cannot move left. Consequently, this routine returns.

At Step S37, if the right allowance yR is greater than the width W of the vehicle 64, there is a possibility that the vehicle 64 can move right. Consequently, it is decided whether the lateral moving amount yO of the vehicle 64 is equal to or greater than a length of L1 tan $\theta R' + W/2$ (Step S39) in order to decide whether the vehicle 64 can run abreast of the forward vehicle 63. If the lateral moving amount yO is equal to or greater than the length of L1 tan $\theta R' + W/2$, a y-flag is equal to 1 (Step S40). Then, this routine proceeds to Step S42. If the lateral moving amount yO is smaller than the length of L1 tan $\theta R' + W/2$, this routine returns. At Step S38, if the left allowance yL is greater than the width W of the vehicle 64, there is a possibility that the vehicle 64 can move left. Consequently, it is decided whether the lateral moving amount yO is equal to or greater than a length of L1 tan $\theta L' + W/2$ (Step S41) in order to decide whether the vehicle 64 can run abreast of the forward vehicle 63. If the lateral moving amount yO is equal to or greater than the length of L1 tan $\theta L' + W/2$, this routine proceeds to Step S42. If the lateral moving amount yO is smaller than the length of L1 tan $\theta L' + W/2$, this routine returns.

At Step S42, it is decided whether the y-flag is equal to 1. if the y-flag is equal to 1, automatic steering is performed with a pattern which changes from right to left so that contact is avoided (Step S43). If the y-flag is not equal to 1, automatic steering is performed with a pattern which changes from left to right so that contact is avoided (Step S44).

It is then decided whether the passing time T1 has elapsed (Step S45). Until the passing time T1 elapses, automatic steering is continued. After the passing time T1 elapses, corrective steering is performed (Step S46). Then, this routine returns.

Figure 13:
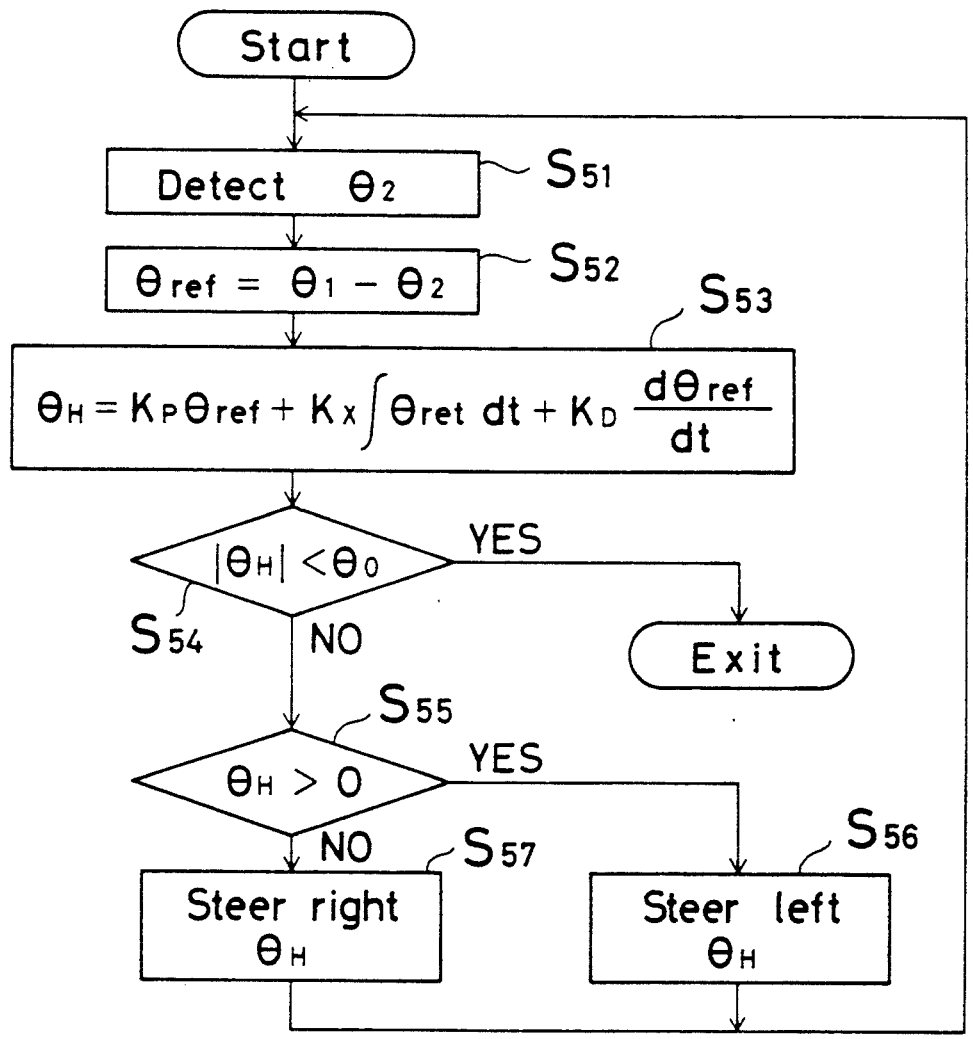
FIG. 13 is a flow chart showing the processing of corrective steering.

The corrective steering in Step S46 is performed as shown in FIG. 13.

First, a yaw angle $\theta 2$ after steering start is detected by integrating the output of a yaw rate gyro (step S51).

Then, there is calculated a difference $\theta$ ref between a yaw angle $\theta 1$ before steering start and the yaw angle $\theta 2$ after steering start (Step S52). Based on the difference $\theta$ ref, an automatic steering angle $\theta$ H is detected (Step S53).

It is decided whether the absolute value of the automatic steering angle $\theta$ H is smaller than a play $\theta 0$ of the steering angle (Step S54). If the absolute value of the automatic steering angle $\theta$ H is smaller than the play $\theta 0$, steering is not needed so that this routine ends. If the absolute value of the automatic steering angle $\theta$ H is not smaller than the play $\theta 0$, it is decided whether the automatic steering angle $\theta$ H is positive (Step S55). If the automatic steering angle $\theta$ H is positive, steering is performed left by the steering angle $\theta$ H (Step S56). If the automatic steering angle $\theta$ H is not positive, steering is performed right by the steering angle $\theta$ H (Step S57).

Thus, corrective steering is performed. Consequently, there can be eliminated the deviation of advance directions when starting steering and after ending steering.

If the friction coefficient $\mu$ is changed during automatic braking performed by the automatic braking device so that the rear-end contact with the forward vehicle cannot be avoided only by automatic braking, automatic steering is carried out. To that end, the control unit 45 includes contact forecasting means 45A, automatic braking control means 45B, environment detecting means 45C and automatic steering control means 45D. The contact forecasting means 45A forecasts the contact of a vehicle with an obstacle. The automatic braking control means 45B receives the output of the contact forecasting means 45A and operates the automatic braking device when the contact of the vehicle with the obstacle is forecasted. The environment detecting means 45C detects the change of environment such as a friction coefficient of a road. The automatic steering control means 45D receives the output of the environment detecting means 45C, and operates the automatic steering device so as to alter the advance direction of the vehicle when a possibility of contact is caused by the change of environment during automatic braking.

Figure 14:
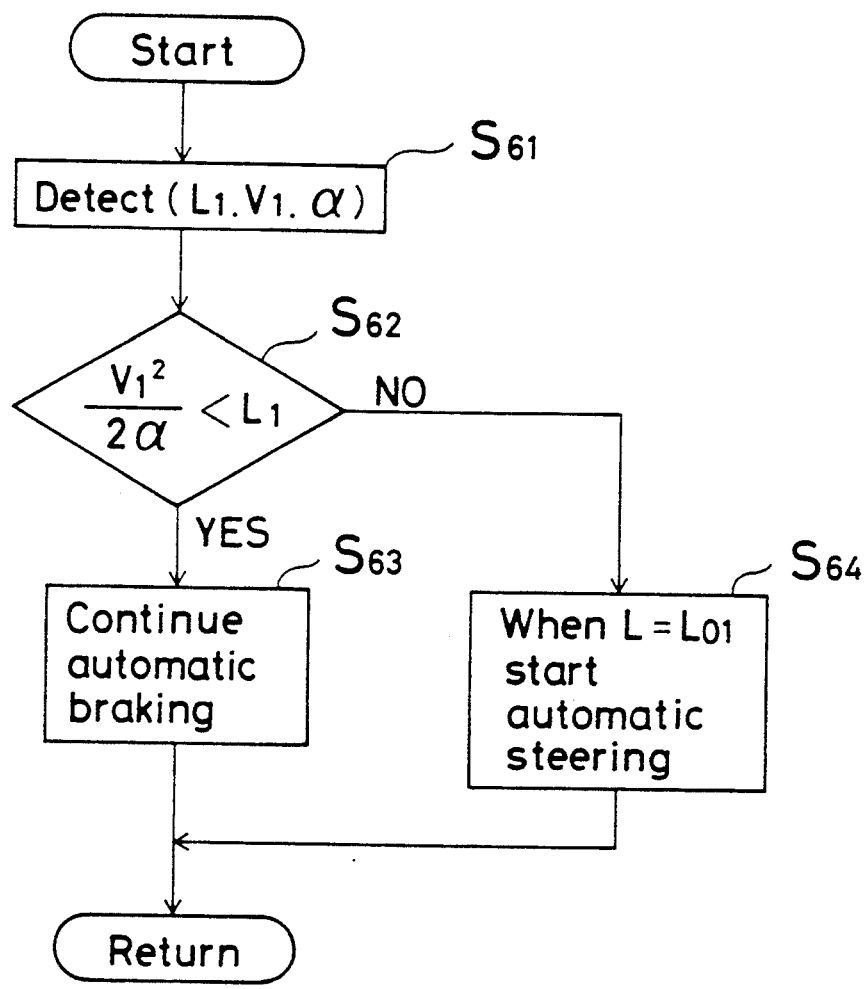
FIG. 14 is a flow chart showing the control for performing automatic steering when a friction coefficient of a road is changed during automatic braking.

As shown in FIG. 14, control is carried out. More specifically, there are first detected a distance L1 between vehicles, a relative speed V and an automatic braking deceleration $\alpha$ (Step S61). To decide whether rear end contact is caused by the change of the friction coefficient of a road, it is decided whether the distance L1 is greater than a distance ($V^2/2\ \alpha$) necessary for braking so as to prevent the rear-end contact (Step S62). If the distance L1 is greater than the distance ($V^2/2\ \alpha$), contact can be avoided by automatic braking so that automatic braking is continued (Step S63). If the distance L1 is not greater than the distance ($V^2/2\ \alpha$), contact may be caused by automatic braking. Consequently, when there is reached a distance at which contact can be avoided by steering, automatic steering is started (Step S64). Then, this routine returns.

To ensure the prevention of contact, it is also possible to perform braking to some extent so as to reduce the speed and perform automatic steering when the speed is equal to or greater than a constant speed.

Figure 15:
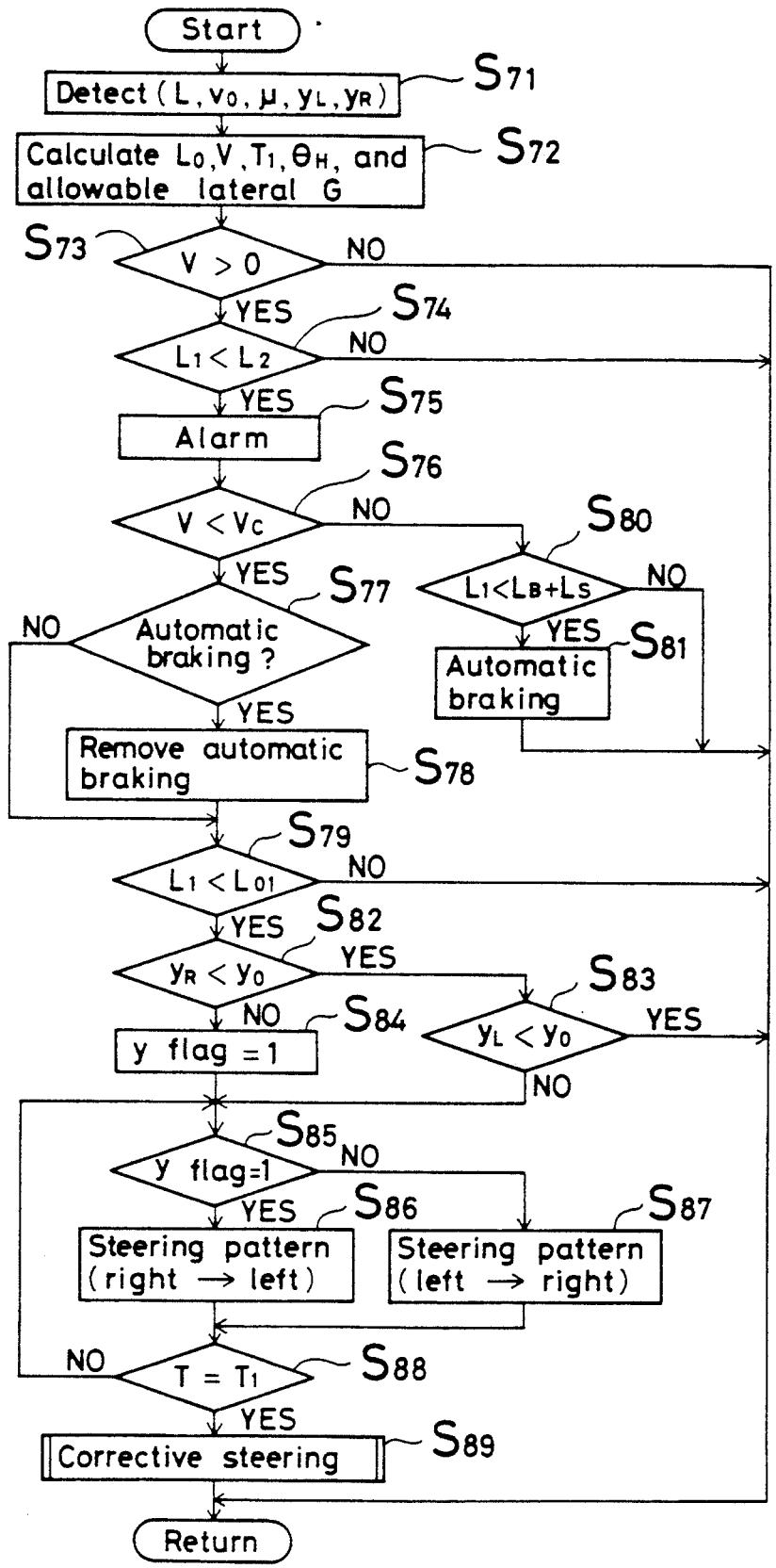
FIG. 15 is a flow chart showing the control for prohibiting automatic steering when the speed of the vehicle is equal to or greater than a constant speed.

As shown in FIG. 15, there are first detected a distance L between a vehicle and a forward vehicle, a speed v0 of the vehicle, a friction coefficient $\mu$ of a road, a left allowance yL and a right allowance yR (Step S71). Based on detected values, there are calculated a minimum distance L0 between vehicles, a relative speed V (=v0−v1) of a vehicle to a forward vehicle, a passing time T1, a steering angle $\theta$ H and an allowable lateral G (Step S72).

It is decided whether the relative speed V is greater than 0 in order to check whether there is a possibility of contact (Step S73).

If the relative speed V is greater than 0, there is a possibility of contact. Consequently, it is decided whether the distance L1 between vehicles is smaller than an alarm distance L2 (Step S74). If the distance L1 is smaller than the alarm distance L2, an alarm is raised (Step S75). If the distance L1 is not smaller than the alarm distance L2, this routine returns.

After the alarm is raised, it is decided whether the relative speed V is smaller than an upper limit speed Vc at which automatic steering is started (Step S76). If the relative speed V is smaller than the upper limit speed Vc, it is decided whether automatic braking is being performed in order to carry out automatic steering (Step S77). If decision is YES, automatic braking is removed (Step S78). If decision is NO, this routine proceeds to Step S79.

If the relative speed V is not smaller than the upper limit speed Vc, it is decided whether the distance L1 is smaller than the sum of a distance LB necessary to reduce the speed of the vehicle to Vc and a distance Ls at which contact can be avoided by automatic steering when the speed is Vc (Step S80). If the distance L1 is smaller than the sum of the distance LB and the distance Ls, automatic braking is started (Step S81). If the distance L1 is not smaller than the sum of the distance LB and the distance Ls, this routine returns.

At Step S79, it is decided whether the distance L1 is smaller than the minimum distance L01. If the distance L1 is smaller than the minimum distance L01, it is necessary to avoid contact. Consequently, it is decided whether the right allowance yR is smaller than a necessary lateral moving amount y0 (Step S82). If the right allowance yR is smaller than the necessary lateral moving amount y0, it is impossible to move right. Consequently, it is decided whether the left allowance yL is smaller than the necessary lateral moving amount y0 (Step S83). If the left allowance yL is smaller than the necessary lateral moving amount y0, it is impossible to move left. Accordingly, this routine returns.

If the right allowance yR is not smaller than the necessary lateral moving amount y0, a y-flag is equal to 1 (Step S84). If the left allowance yL is not smaller than the necessary lateral moving amount y0, this routine proceeds to Step S85. At Step S85, it is decided whether the y-flag is equal to 1.

If the y-flag is equal to 1, automatic steering is performed with a pattern which changes from right to left so that contact is avoided (Step S86). If the y-flag is not equal to 1, automatic steering is performed with a pattern which changes from left to right so that contact is avoided (Step S87).

It is then decided whether the passing time T1 has elapsed (Step S88). Until the passing time T1 elapses, automatic steering is continued. After the passing time T1 elapses, corrective steering is performed (Step S89). Then, this routine returns.

In case there are provided a transmitter for transmitting information on a vehicle such as braking operation, accelerating operation or winker operation and a receiver for receiving the same so as to perform communication between vehicles, it is possible to prohibit the operation of the automatic steering device and avoid contact only by the automatic braking device when vehicles (other than a just forward vehicle) are recognized around.

Figure 16:
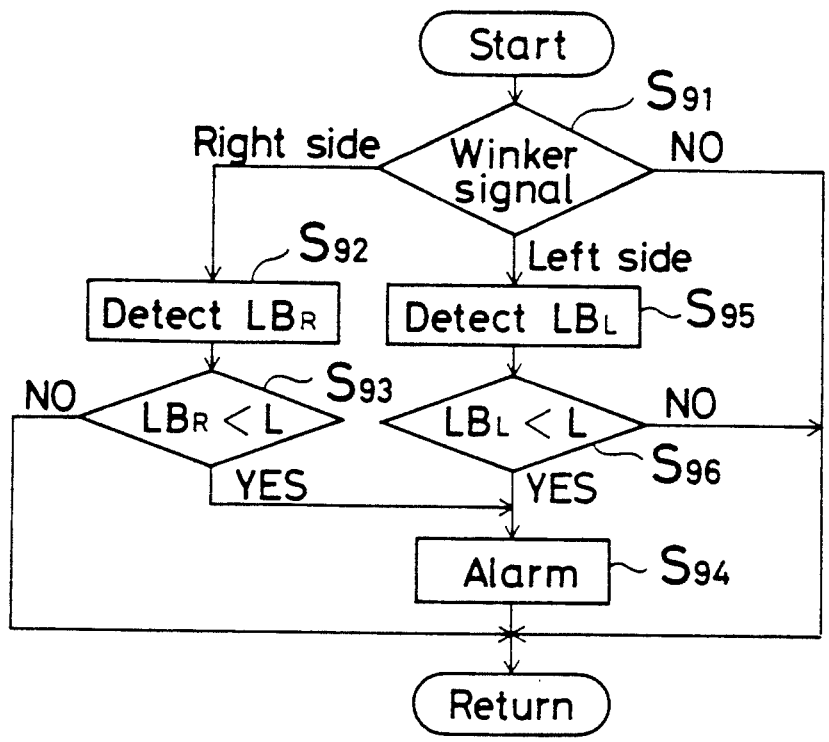
FIG. 16 is a flow chart showing the control for prohibiting automatic steering when other vehicles run around.
Figure 17:
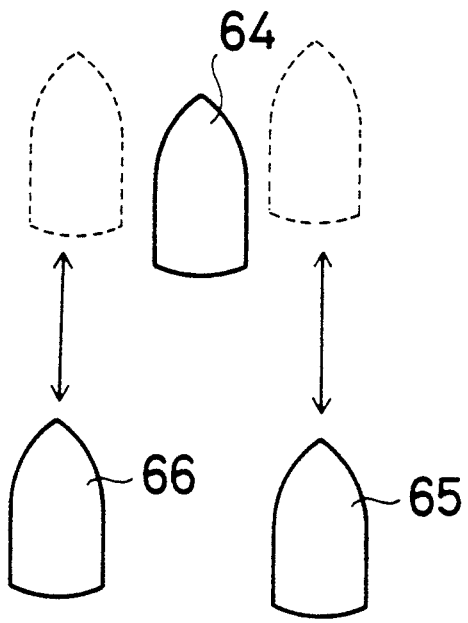
FIG. 17 is a diagram showing the relationship between the vehicle and other vehicles which run therearound.

There will be described an example of control in the above-mentioned case. As shown in FIG. 16, it is first decided whether a turn signal is inputted (Step S91). If the signal is on the right side, a distance LBR between the vehicle 64 and a vehicle 65 on the right side (see FIG. 17) is detected by a known method (Step S92). It is decided whether the distance LBR is smaller than a predetermined distance L (Step S93). If the distance LBR is smaller than the predetermined distance L, a possibility of contact is caused by automatic steering. Consequently, an alarm is raised to prohibit automatic steering (Step S94). If the distance LBR is not smaller than the predetermined distance L, this routine returns.

If the signal is on the left side, a distance LBL between the vehicle 64 and a vehicle 66 on the left side (see FIG. 17) is detected by a known method (Step S95). It is decided whether the distance LBL is smaller than a predetermined distance L (Step S96). If the distance LBL is smaller than the predetermined distance L, a possibility of contact is caused by automatic steering. Consequently, the alarm is raised to prohibit automatic steering (Step S94). If the distance LBL is not smaller than the predetermined distance L, this routine returns.

If there is not a turn signal, no other vehicles are around. This routine returns.

In case the directivity of the transmitter and receiver is made greater, communication can be performed on vehicles only in a longitudinal direction and a turn signal is transmitted from the forward vehicle, it is possible to prohibit the automatic steering of the vehicle so as to avoid contact.

Figure 18:
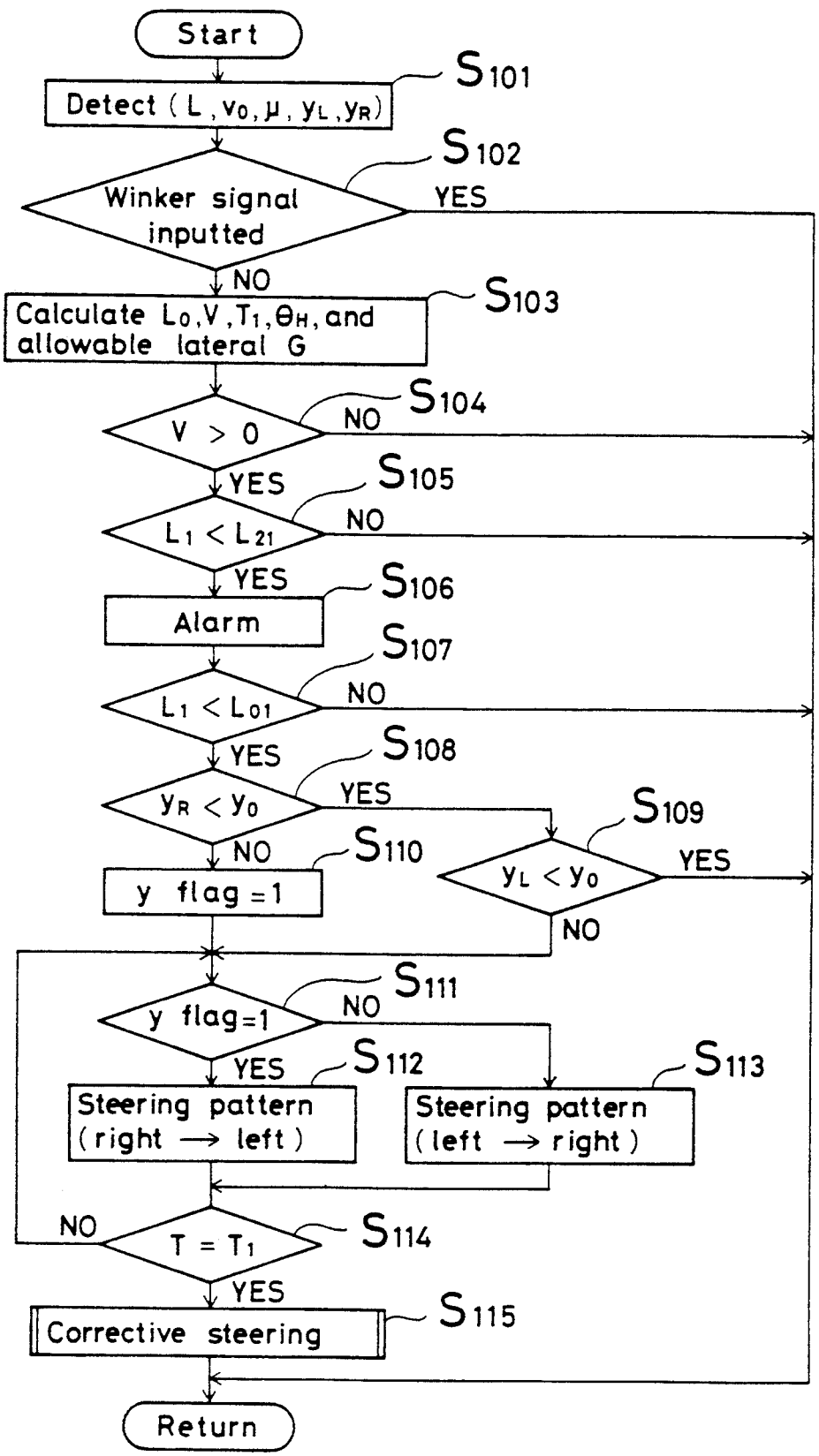
FIG. 18 is a flow chart showing the control for prohibiting automatic steering in response to a winker signal.

FIG. 18 shows an example of control in the above-mentioned case.

As shown in FIG. 18, there are first detected a distance L between vehicles, a speed v0 of a vehicle, a friction coefficient $\mu$ of a road, a left allowance yL and a right allowance yR (Step S101).

It is then decided whether a turn signal is inputted (Step S102). If the turn signal is inputted, the vehicle may come in contact with the forward vehicle by automatic steering. Accordingly, this routine returns without performing automatic steering. If the turn signal is not inputted, this routine proceeds to Step S103 so as to perform automatic steering.

At Step S103, a minimum distance L0 between vehicles, a relative speed V ($=v0-v1$) of a vehicle to a forward vehicle, a passing time T1, a steering angle $\theta$ H and an allowable lateral G are calculated based on detected values.

It is decided whether the relative speed V is greater than 0 in order to check whether there is a possibility of contact (Step S104).

If the relative speed V is greater than 0, there is a possibility of contact. Consequently, it is decided whether the distance L1 is smaller than an alarm distance L2 (Step S105). If the distance L1 is smaller than the alarm distance L2, an alarm is raised (Step S106). If the distance L1 is not smaller than the alarm distance L2, this routine returns.

After the alarm is raised, it is decided whether the distance L1 is smaller than the minimum distance L0 (Step S107). If the distance L1 is smaller than the minimum distance L0, it is necessary to avoid contact. Consequently, it is decided whether the right allowance yR is smaller than a necessary lateral moving amount y0 (Step S108). If the right allowance yR is smaller than the necessary lateral moving amount y0, it is impossible to move right. Consequently, it is decided whether the left allowance yL is smaller than the necessary lateral moving amount y0 (Step S109). If the left allowance yL is smaller than the necessary lateral moving amount y0, it is impossible to move left. Accordingly, this routine returns.

If the right allowance yR is not smaller than the necessary lateral moving amount y0, a y-flag is equal to 1 (Step S110). If the left allowance yL is not smaller than the necessary lateral moving amount y0, this routine proceeds to Step S111. At Step S111, it is decided whether the y-flag is equal to 1.

If the y-flag is equal to 1, automatic steering is performed with a pattern which changes from right to left so that contact is avoided (Step S112). If the y-flag is not equal to 1, automatic steering is performed with a pattern which changes from left to right so that contact is avoided (Step S113).

It is then decided whether the passing time T1 has elapsed (Step S114). Until the passing time T1 elapses, automatic steering is continued. After the passing time T1 elapses, corrective steering is performed (Step S115). Then, this routine returns.

Thus, it is possible to prevent the vehicle from coming in contact with other vehicles which run therearound.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A contact preventive apparatus for vehicles, comprising:
    an automatic steering device for performing steering to prevent a vehicle from coming in contact with an obstacle;
    an automatic braking device for automatically braking wheels of the vehicle;
    contact forecasting means for forecasting the contact of the obstacle with the vehicle and generating an output signal;
    automatic braking control means for receiving the output signal of said contact forecasting means and operating the automatic braking device when the contact of the obstacle is forecasted;
    environment detecting means for detecting a change of environment acting on the vehicle and generating an output signal indicative of the change; and
    automatic steering control means for operating the automatic steering device to alter the advance direction of the vehicle when receiving the output signal of said environment detecting means during automatic braking.

2. A contact preventive apparatus for vehicles according to claim 1, wherein the contact forecasting means forecasts that the vehicle may come in contact with the obstacle when the relative speed of the vehicle to the obstacle is smaller than 0 and the distance between the vehicle and the obstacle is not greater than a predetermined distance.

3. A contact preventive apparatus for vehicles according to claim 1, wherein the automatic steering control means continues automatic steering until a time for passing the obstacle elapses.

4. A contact preventive apparatus for vehicles according to claim 3, wherein the automatic steering control means performs corrective steering in which the advance direction after ending automatic steering is caused to correspond to that when starting steering after the passing time elapses.

5. A contact preventive apparatus for vehicles according to claim 1, wherein the environment detecting means recognizes other vehicles around, and
    the automatic braking control means receives the output signal of the environment detecting means, and regulates the control of the automatic steering device performed by the automatic steering control means to operate the automatic braking device when other vehicles are recognized around.

6. A contact preventive apparatus for vehicles according to claim 1, wherein the environment detecting means detects the presence of a turn signal.

7. A contact preventive apparatus for vehicles according to claim 1, wherein the environment detecting means detects the presence of a friction coefficient of a road on which a vehicle runs.

8. A contact preventive apparatus for vehicles according to claim 1, wherein the automatic steering control means removes braking performed by automatic braking device when receiving the output of said environment detecting means during automatic braking.

9. A contact preventive apparatus for vehicles according to claim 8, further comprising speed detecting means for detecting the speed of a vehicle,
    wherein the automatic braking control means receives the output of said speed detecting means, and regulates the control of the automatic steering device performed by the automatic steering control means to operate the automatic braking device when the speed of the vehicle is equal to or greater than a predetermined speed.

10. A contact preventive apparatus for vehicles according to claim 8, wherein the automatic braking control means performs automatic braking if the distance between the vehicle and the obstacle is smaller than the sum of a distance necessary to reduce the speed of the vehicle to a constant speed and a distance at which the contact of the vehicle with the obstacle can be avoided by automatic steering when the speed of the vehicle is a predetermined speed.

11. A contact preventive apparatus for vehicles, having an automatic steering device for performing steering to prevent a vehicle from coming in contact with an obstacle and an automatic braking device for automatically braking wheels, comprising:
    contact forecasting means for forecasting the contact of the obstacle with the vehicle and generating an output signal;
    automatic braking control means for receiving the output signal of said contact forecasting means and operating the automatic braking device when forecasting the contact of the obstacle;
    automatic steering control means for operating the automatic steering device to alter the advance direction of the vehicle when deciding that it is impossible to prevent a vehicle from coming in contact with an obstacle only by automatic braking during automatic braking.

* * * * *